(12) United States Patent
Tang et al.

(10) Patent No.: US 10,681,393 B2
(45) Date of Patent: Jun. 9, 2020

(54) SYSTEMS AND METHODS FOR DISPLAYING MULTIPLE VIDEOS

(71) Applicant: Chengdu CK Technology CO., LTD., Chengdu (CN)

(72) Inventors: Zhenghua Tang, Chengdu (CN); Hanfei Yang, Chengdu (CN)

(73) Assignee: CHENGDU SIOEYE TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 16/336,357

(22) PCT Filed: Sep. 27, 2017

(86) PCT No.: PCT/CN2017/103712
§ 371 (c)(1),
(2) Date: Mar. 25, 2019

(87) PCT Pub. No.: WO2018/059449
PCT Pub. Date: Apr. 5, 2018

(65) Prior Publication Data
US 2019/0230386 A1 Jul. 25, 2019

(30) Foreign Application Priority Data
Sep. 27, 2016 (CN) .......................... 2016 1 0852852

(51) Int. Cl.
*H04N 21/2187* (2011.01)
*H04N 21/234* (2011.01)
(Continued)

(52) U.S. Cl.
CPC ... *H04N 21/2187* (2013.01); *H04N 21/21805* (2013.01); *H04N 21/23418* (2013.01); *H04N 21/242* (2013.01); *H04N 21/25891* (2013.01); *H04N 21/2665* (2013.01); *H04N 21/278* (2013.01); *H04N 21/4122* (2013.01); *H04N 21/4223* (2013.01); *H04N 21/4307* (2013.01); *H04N 21/437* (2013.01); *H04N 21/4312* (2013.01); *H04N 21/4316* (2013.01); *H04N 21/4325* (2013.01); *H04N 21/4347* (2013.01);
(Continued)

(58) Field of Classification Search
CPC .................................................. H04N 21/2187
See application file for complete search history.

(56) References Cited

U.S. PATENT DOCUMENTS

2014/0344868 A1\* 11/2014 Hu ....................... H04N 21/482
725/59
2018/0014037 A1\* 1/2018 Venkatraman et al. ....................
H04N 5/772
386/224

\* cited by examiner

*Primary Examiner* — Michael H Hong
(74) *Attorney, Agent, or Firm* — Perkins Coie LLP (57) ABSTRACT

The present disclosure relates to methods and associated systems that enable a user to managing multiple broadcasting images (e.g., live stream videos). The method includes, for example, (1) receiving multiple sets of live streams, at a server, from multiple image sources; (2) synchronizing the received sets of live streams; (3) identifying first/second sets of live streams from the received sets of live streams based on predetermined criteria; (4) analyzing the first/second live streams; (5) creating a predetermined configuration to decide a switching point of displaying areas at least based in part on the first status and the second status; (6) transmitting the first/second sets of live streams to a user device to display; and (7) in response to the predetermined configuration, enabling a user to switch the displayed live streams.

20 Claims, 7 Drawing Sheets

(51) Int. Cl.
*H04N 21/258* (2011.01)
*H04N 21/437* (2011.01)
*H04N 21/41* (2011.01)
*H04N 21/2665* (2011.01)
*H04N 21/4223* (2011.01)
*H04N 21/431* (2011.01)
*H04N 21/845* (2011.01)
*H04N 21/218* (2011.01)
*H04N 21/434* (2011.01)
*H04N 21/432* (2011.01)
*H04N 21/242* (2011.01)
*H04N 21/278* (2011.01)
*H04N 21/43* (2011.01)
*H04N 21/45* (2011.01)
*H04N 21/458* (2011.01)

(52) U.S. Cl.
CPC ..... *H04N 21/4532* (2013.01); *H04N 21/4586* (2013.01); *H04N 21/8455* (2013.01)

SYSTEMS AND METHODS FOR DISPLAYING MULTIPLE VIDEOS

CROSS-REFERENCE TO RELATED APPLICATIONS

This application is a 35 U.S.C. § 371 U.S. National Phase application of International Patent Application No. PCT/CN2017/103712, filed Sep. 27, 2017, which claims the benefit of Chinese Patent Application No. 201610852852.2 filed Sep. 27, 2016 and entitled "A METHOD FOR BROADCASTING VIDEOS," the content of which is hereby incorporated by reference in their entireties.

BACKGROUND

It has become more and more popular to live broadcast videos collected by a mobile device with a camera. By live broadcasting these videos, users can share their lives or particular events with their contacts or the public. Traditionally, a viewer can only watch one live broadcasting at one time. It could be inconvenient or challenging for a user who wants to view a live-broadcasting event from different angles of view or in a customized way. To address such a need, an improved method or system for managing and displaying live broadcasting videos that enable a viewer to have a customized viewing experience is advantageous.

BRIEF DESCRIPTION OF THE DRAWINGS

Embodiments of the disclosed technology will be described and explained through the use of the accompanying drawings.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to methods for managing and/or displaying multiple sets of images (e.g., live broadcasting videos from various cameras, image servers, image sources, etc.). The method can be implemented by a system that is capable of receiving, analyzing, managing, and/or displaying the sets of images. For example, the system can include an image server that can receive multiple live broadcasting videos from various image sources (e.g., cameras, social networks, media servers, etc.). The system then analyzes the broadcasting videos (e.g., to determine when/where the videos were made, their angles of view, etc.) and manage the same (e.g., to store or adjust the videos based on viewer's preferences). The videos can then be transmitted to a viewer's device (e.g., a smartphone) for display. The viewer can determine how these videos are displayed in a customized way.

For example, the viewer can choose one of the videos as a "primary" video and let this video be played in a center area of a display of his device. The viewer can select multiple "secondary" videos to be displayed in the corner areas of the display (e.g., each occupies a smaller displaying area than does the primary video). The primary video and the secondary videos are displayed together, which enables the viewers to observe an event or an object from various angles of views at the same time. The present system also enables the viewer to adjust the videos in a real-time fashion. For example, the viewer can select one of the secondary videos as a new primary video by "clicking" that secondary video (or an associated icon) shown in a touchscreen display. In some embodiments, the viewer can also dynamically adjust the displaying areas of the primary and secondary videos (e.g., by operating the viewer's fingers on a touchscreen display). By this arrangement, the present system enables a viewer to view multiple livestream videos in a customized, convenient manner.

As an example, the claimed system can receive multiple live stream images from various cameras (e.g., a fixed camera located at the home base, the first base, or the third base in a baseball field) and smartphones (e.g., held by an audience sitting in the outer field in the baseball field) in a major league baseball game. The claimed system can receive the multiple live stream images from the cameras or from a social media server (e.g., an audience is live broadcasting a game and uploading related videos to the social media server). The claimed system can manage the received live stream images and then edit the same based on viewer's preferences (e.g., setting the home base camera as a primary video source, the other available cameras as secondary video sources, etc.). The claimed system can then transmit the edited images to a viewer's mobile device for display.

In some embodiments, the claimed system can automatically display the best available images to a viewer. For example, in an event that the images from a primary video source are not available (e.g., lost connection) or are at low image quality, the system can select a secondary video source to replace the primary video source (e.g., based on viewer's prior configuration, preferences, prior viewing habits/histories, account settings, etc.).

Another aspect of the present disclosure includes providing a user interface that enables a viewer to effectively manage or monitor multiple sets of images. The present technology enables a user to initiate a process of viewing multiple live broadcast videos at the same time on a user interface of a user device. Examples of the user device include a smartphone, a smart watch, a sports camera, a wearable device, a tablet, a notebook, a terminal computer etc.). The user device communicates with one or more image servers via a wireless network (e.g., a 3G/4G network, the Internet, etc.).

A representative image server system includes, inter alia, (i) a processor; (ii) a memory coupled to the processor; (iii) a communication device coupled to the processor and configured to receive multiple sets of live stream images; and (iv) a database coupled to the processor and configured to store the multiple sets of live streams. The image server can execute instructions to: (1) synchronize the stored live streams based on image information associated with the received live streamss; (2) in response to a user setting or input, identify a first live stream from the stored live stream images; (3) in response to the user setting, identify a second live stream from the stored live stream images; (4) analyzing a first status (e.g., continuality) of the first live stream; (5) analyzing a second status (e.g., continuality) of the second live stream; (6) creating a predetermined configuration to decide a switching point of displaying areas at least based in part on the first status and the second status before displaying the first live stream and the second live stream; (7) transmit the first live stream to a user device; and (8) transmit the second live stream to the user device. The first live stream is configured to be displayed in a first area of a user interface of the user device, and the second live stream is configured to be displayed in a second area of the user interface of the user device. The first area (e.g., a primary displaying area) is greater than the second area (e.g., a secondary displaying area). In some embodiments, the switching point can be a time point when a user decides to change the way that the live streams are displayed (e.g., in different displaying areas). In some embodiments, the switching point can be associated with a triggering event (e.g., an object shown in a live stream, low connectivity, a user request or action, an environmental condition, etc.).

The disclosed technology can determine (or provide recommendations regarding) how to visually present the identified first and second live streams based on their statuses. For example, the claimed technology can first analyze the continuity of the first identified live stream (e.g., no break/interruption, or having a minor interruption less than a threshold value such as 10 seconds) and then determine whether to display the first identified live stream in the first area. In some embodiments, if the first status does not meet a threshold, the disclosed technology can (1) decide not to display the identified first live stream in the first area (e.g., it can still be displayed in the second area) and search for a new first live stream to be displayed in the first area; (2) display the identified live stream in the first area after receiving a user's confirmation; or (3) adjust the dimension/location of the first area (e.g., reduce the size thereof or move the first area to a side of the user interface). Similarly, the disclosed technology can analyze the continuity (or another status) of the second identified live stream and then determine whether to display the second identified live stream in the second area. Examples of the first/second statuses include: image quality of live stream, creator/source/publisher of live stream, etc.

In response to a user request or a triggering event (e.g., lost connection between an image source, a user request or action, an environmental condition, etc.), the image server can adjust accordingly and then transmit the best available images (or other backup images based on user settings or other rules) to the user device for display.

In some embodiments, the present system can include an account management component configured to manage viewers' accounts. The account management component can track multiple viewers' preferences, subscription status, authentication information and/or other suitable information so as to provide a proper live streaming service to the viewers. For example, the account management component can determine which image sources a viewer has access to (e.g., a viewer is authorized to view his friend's live broadcast through a social media platform).

The systems and associated methods in accordance with the present technology enable a viewer to manager or view multiple live broadcast videos in a flexible, safe, intuitive, and convenient fashion. Advantages of the present technology include providing a system that can effectively and efficiently manage multiple live stream images and/or corresponding image devices via a network.

Another aspect of the present technology includes that it enables the images to be broadcasted coming from various image devices. The present technology can coordinate with these image devices and generate an incorporated or integrated live stream that can be live broadcasted. In some embodiments, the present technology also allows a user to "switch" image sources when viewing a live event. For example, a user can first select a fixed camera as his primary video source for a baseball game. When a hitter hits a home run toward the left outer field, the user can quickly select a smartphone held by an audience sitting close to the left outer field (who is live streaming the game) as his primary video source, such that the user can have an instant view of the live event.

Figure 1:
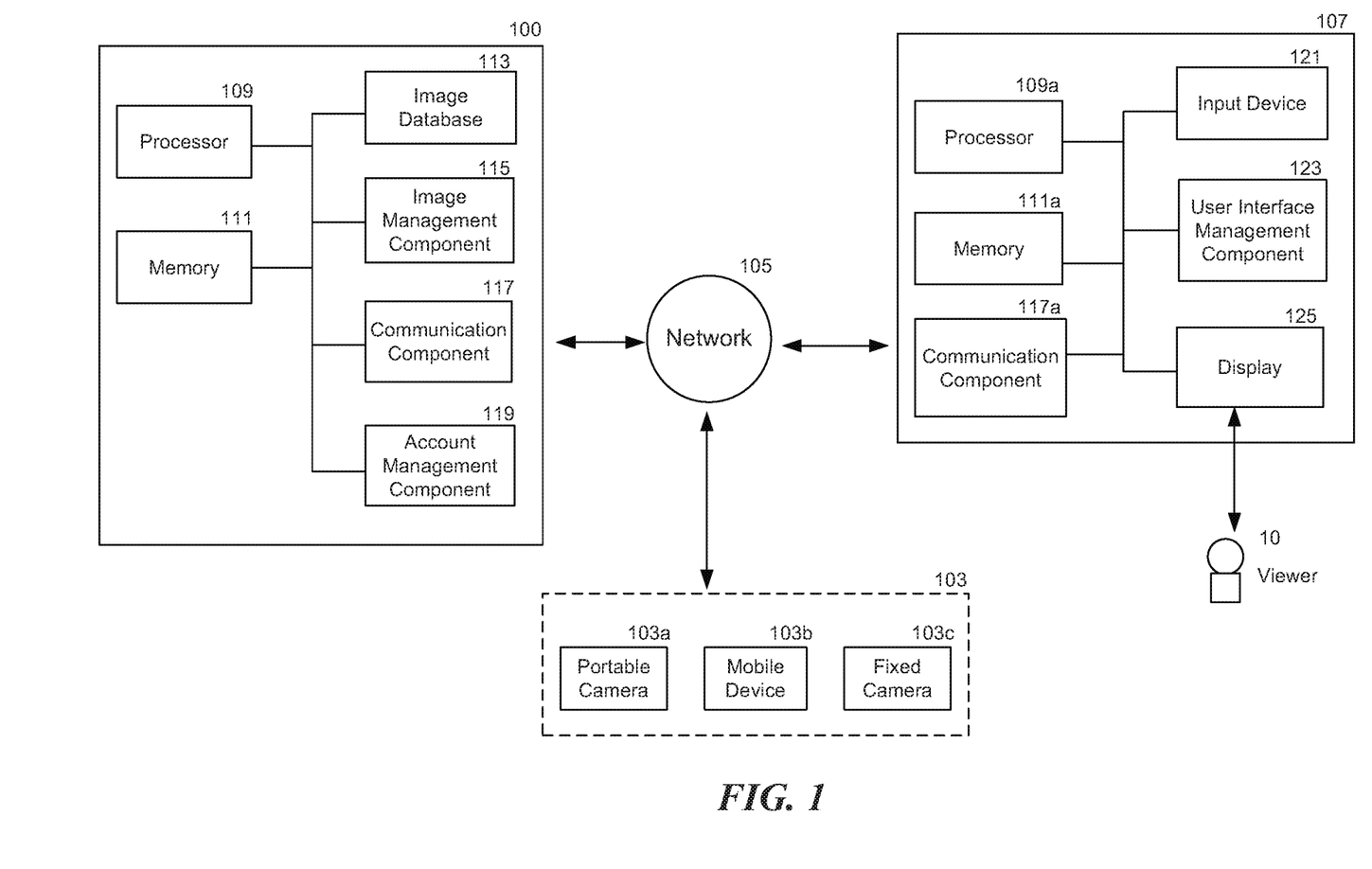
FIG. 1 is a schematic diagram illustrating a system in accordance with embodiments of the disclosed technology.

FIG. 1 is a schematic diagram illustrating a system 100 in accordance with embodiments of the disclosed technology. The system 100 can be implemented as an image server that can receive images from image collection devices 103 (including a portable camera 103a, a mobile device 103b, and a fixed camera 103c) and transmit the received images (e.g., after certain edits, adjustments, or analyses) to a user device 107 for display via a network 105. A viewer 10 can then view the transmitted images by the user device 107.

The system 100 includes a processor 109, a memory 111, an image database 113, an image management component 115, a communication component 117, and an account management component 119. The processor 109 is configured to control the memory 111 and other components (e.g., components 113-119) in the system 100. The memory 111 is coupled to the processor 109 and configured to store instructions for controlling other components or other information in the system 100.

The image database 113 is configured to store, temporarily or permanently, image files (e.g., live broadcasting videos) from the image collection devices 103. In some embodiments, the image database 113 can have a distributed structure such that it can include multiple physical/virtual partitions across the network 105. In some embodiments, the image database 113 can be a hard disk drive or other suitable storage means.

The communication component 117 is configured to communicate with other devices (e.g., user device 107 or image collection devices 103) and servers (e.g., social network server, other image servers, etc., now shown in FIG. 1) via the network 105. In some embodiments, the communication component 117 can be an integrated chip/module/component that is capable of communicating with multiple devices.

As shown in FIG. 1, the user device 107 includes a processor 109a, a memory 111a, and a communication component 117a, which can perform functions similar to those of the processor 109, the memory 111, and the communication component 117, respectively.

The image management component 115 is configured to analyze, manage, and/or edit the received the image files. For example, the image management component 115 can analyze image information (e.g., image quality, duration, time of creation, location of creation, created by which device, uploaded to which image server, authenticated by which social media, etc.) associated with the received image files and then synchronize the images files (e.g., to adjust the time label of each image files such that these image files can be referenced by a unified timeline). Methods of synchronizing the image files include, for example, (1) comparing an image time label of each image files to a system time label used by the system 100; (2) determining time differences, if any, between the system time label and the image time labels; and (3) adjusting the image time labels accordingly to the time differences. In other embodiments, however, the image files can be synchronized by other suitable methods.

The image management component 115 stores the synchronized image files in the image database 113 for further process. For example, when the viewer 10 wants to view a set of image files (e.g., live stream files) via the user device 107, the viewer 10 can input, via an input device 121 of the user device 107, one or more criteria (e.g., image sources, time periods, image quality, angles of view, numbers of downloads, continuity thereof, content thereof, etc.) characterizing the image files to be displayed. The criteria are then transmitted to the system 100 via the communication components 117, 117a via the network 105.

Once the system 100 receives the criteria, the image management component 115 then identifies one or more image files to be displayed and then transmit (e.g., live stream) the same to the user device 107. For example, the image management component 115 can identify a "primary" image file and one or more "secondary" image files designated by the viewer 10. In some embodiments, the "primary" and "secondary" image files can be displayed in different areas in a display 125 of the user device 107 (to be discussed in detail below with reference to FIG. 5).

In some embodiments, the image management component 115 can check/analyze the image quality (e.g., continuity) or a data transmission rate for the image files that are streaming of the identified images files before transmitting to the user device 107. In some embodiments, if the identified images do not meet a predetermined threshold, the image management component 115 can (1) decide not to display the identified images; (2) display the identified images after receiving a user's confirmation; or (3) adjust the dimension/location of the displaying areas and display the identified images (e.g., reduce the size thereof or move the displaying areas). In some embodiments, the image management component 115 can adjust or edit the image files according to the criteria (e.g., adding background, filtering, adjusting the sizes thereof, combining two of more image files, etc.).

In some embodiments, the image management component 115 can process the image files based on user preferences managed by an account management component 119. The account management component 119 is configured to manage multiple viewers' configurations, preferences, prior viewing habits/histories, and/or other suitable settings. Such information can be used to determine which image files to be identified and how to process the identified image files before transmitting them to the user device 105 for display.

For example, the account management component 119 can determine that the viewer 10 prefers viewing a golf game by following a particular golfer. In such embodiments, the account management component 119 can provide such information to the image management component 115 such that the image management component 115 can identify suitable image files for the viewer 10. In some embodiments, the account management component 119 can also verify whether the viewer 10 has access to particular image files (e.g., being authorized to live stream from a social network or not).

After the image management component 115 identifies (and/or processes, in some embodiments) the image files based on the criteria and the information provided by the account management component 119, the system 100 then transmits the identified image files to the user device 107 via the network 105.

As shown, the user device 107 includes a user interface management component 123 configured to manage how to display the identified image files transmitted from the system 100. For example, the user interface management component 123 can instruct the display 125 to display the primary image files in a first area and the secondary images in a second area. In some embodiments, the first area can be a center area of the display 125, and the second area can be a corner area (or an area surrounding the center area). In some embodiments, the first area can be more visible or larger than the second area. In some embodiments, the viewer 10 can dynamically adjust the first and second areas via operating the input device 121. In other embodiments, the user interface management component 123 can automatically adjust the first and second areas based on predetermined viewer configurations or preferences.

In some embodiments, the user interface management component 123 can determine how to display the image files in response to a triggering event. For example, if the primary video (which is supposed to be displayed in the first area originally) is not available, the user interface management component 123 can select another image file to display in the first area. Examples of the triggering events include a user request or action, a low image quality, user preferences, environmental conditions, and/or other suitable events. By such arrangement, the viewer 10 can effectively determine the ways to display identified image files.

Figure 2:
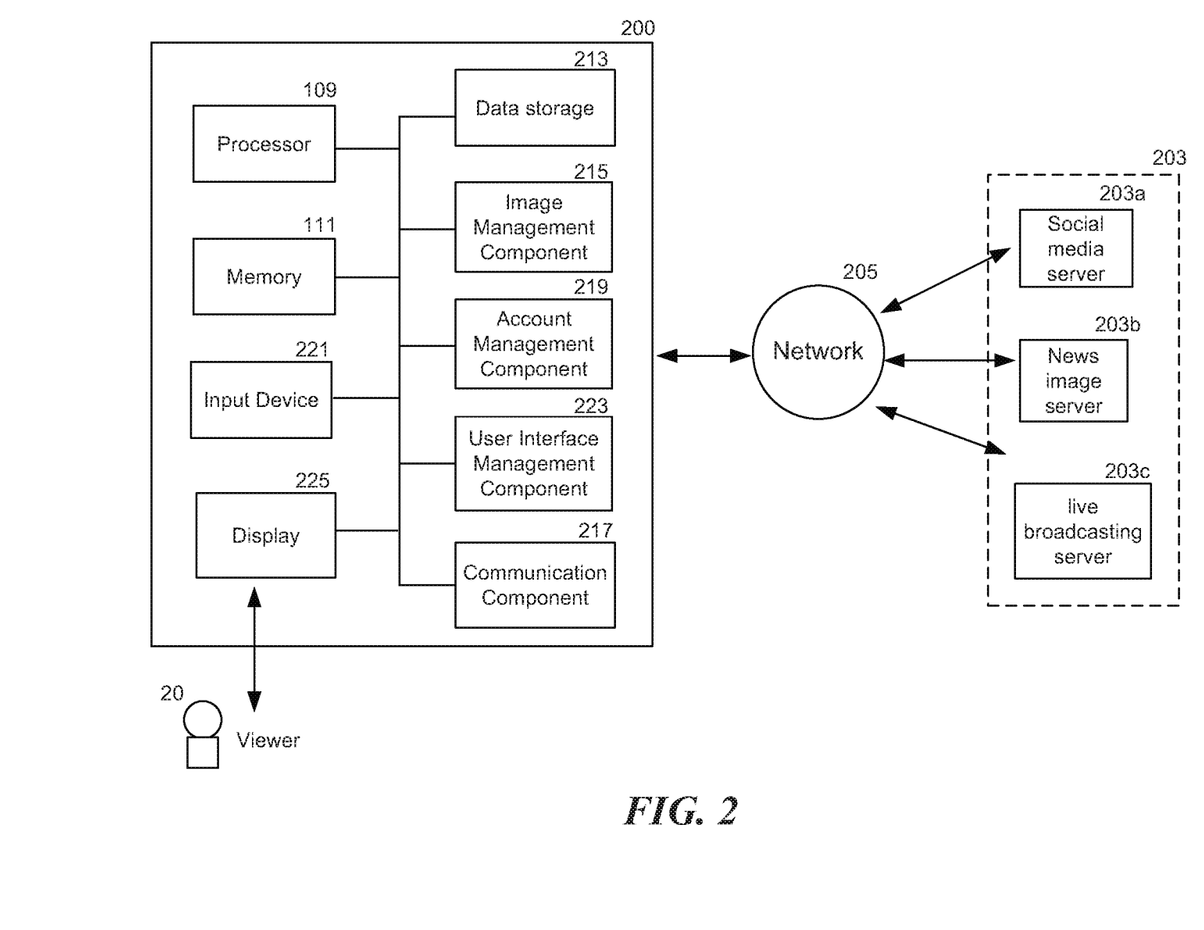
FIG. 2 is a schematic diagram illustrating a system in accordance with embodiments of the disclosed technology.

FIG. 2 is a schematic diagram illustrating a system 200 in accordance with embodiments of the disclosed technology. The system 200 can be implemented as a portable device that can receive images from multiple image sources 203 (e.g., a social media server 203a, a news image server 203b, and a live broadcasting server 203c) via a network 205. The system 200 can manage, edit, adjustment, or analyze the received image files and then display the same to a viewer 20.

As shown in FIG. 2, the system 200 includes a processor 109, a memory 111, a data storage 213, an image management component 215, a communication component 217, an account management component 219, an input device 221, a user interface management component 223, and a display 225. The processor 109 is configured to control the memory 111 and other components (e.g., components 213-225) in the system 200. The memory 111 is coupled to the processor 109 and configured to store instructions for controlling other components or other information in the system 200. The data storage 213 is configured to store, temporarily or permanently, information or data (e.g., received image files from the image sources 203) associated with the system 200. The communication component 217 is configured to communicate with other devices and servers (e.g., the social media server 203*a*, the news image server 203*b*, and the live broadcasting server 203*c*) via the network 205. In some embodiments, the communication component 217 can be an integrated chip/module/component that is capable of communicating with multiple devices.

The image management component 215 is configured to analyze, manage, and/or edit the received the image files. For example, the image management component 215 can analyze image information associated with the received image files and then synchronize the images files. The image management component 215 stores the analyzed image files in the data storage 213. In some embodiments, the image management component 215 can only store a portion of the image files or log files indicative of how to process the received image files.

When the viewer 20 wants to view a set of image files via the system 200, the viewer 20 can input, via the input device 221 (e.g., a touchscreen, a virtual keypad, etc.), one or more criteria (e.g., image sources, time periods, image quality, angles of view, etc.) characterizing the image files to be displayed. Once the system 200 receives the criteria, the image management component 215 accordingly identifies one or more image files to be displayed (e.g., either in the data storage 213 or in the image sources 203).

For example, the image management component 215 can identify a "primary" image file and one or more "secondary" image files designated by the viewer 20. In some embodiments, the "primary" and "secondary" image files can be displayed in different areas in the display 225. In some embodiments, the image management component 215 can check the image quality of the identified images files. In some embodiments, the image management component 215 can further adjust or edit the image files according to the criteria.

In some embodiments, the image management component 215 can assign a priority to each of the image files. In some embodiments, the priority can be assigned based at least in part on the image information/quality thereof. For example, the priority can be assigned based on display frequencies of the image files. In some embodiments, a first live stream having a first displaying frame rate (e.g., 50-60 frames per second, FPS) greater than a second displaying frame rate (e.g., 20-30 FPS). In other embodiments, the displaying frame rate can be other numbers of FPS greater than zero.

The account management component 219 is configured to manage multiple viewers' configurations, preferences, prior viewing habits/histories, settings, etc., and such information can be used to determine which image files to be identified and how to process the identified image files. In some embodiments, the image management component 215 can process the image files based on user preferences managed by the account management component 219. In some embodiments, the account management component 219 can also verify whether the viewer 20 has access to particular image sources.

The user interface management component 223 is configured to manage how to display the identified image files. For example, the user interface management component 223 can instruct the display 225 to display the primary image files in a first area and the secondary images in a second area. In some embodiments, the viewer 20 can dynamically adjust the first and second areas via operating the input device 221. In other embodiments, the user interface management component 223 can automatically adjust the first and second areas based on pre-determined viewer configurations or preferences. In some embodiments, the user interface management component 223 can determine how to display the image files in response to a triggering event. Examples of the triggering events include a user request, a low image quality, user preferences, the availability of image files, data transmission rate/fee (e.g., reaching a monthly cap of data usage based on a user's subscription), and/or other suitable factors. In some embodiments, the triggering event can be a combination of multiple events or user actions. In some embodiments, the triggering event can be set or determined by a user. By such arrangement, the viewer 20 can effectively determine the ways to display identified image files.

Figure 3:
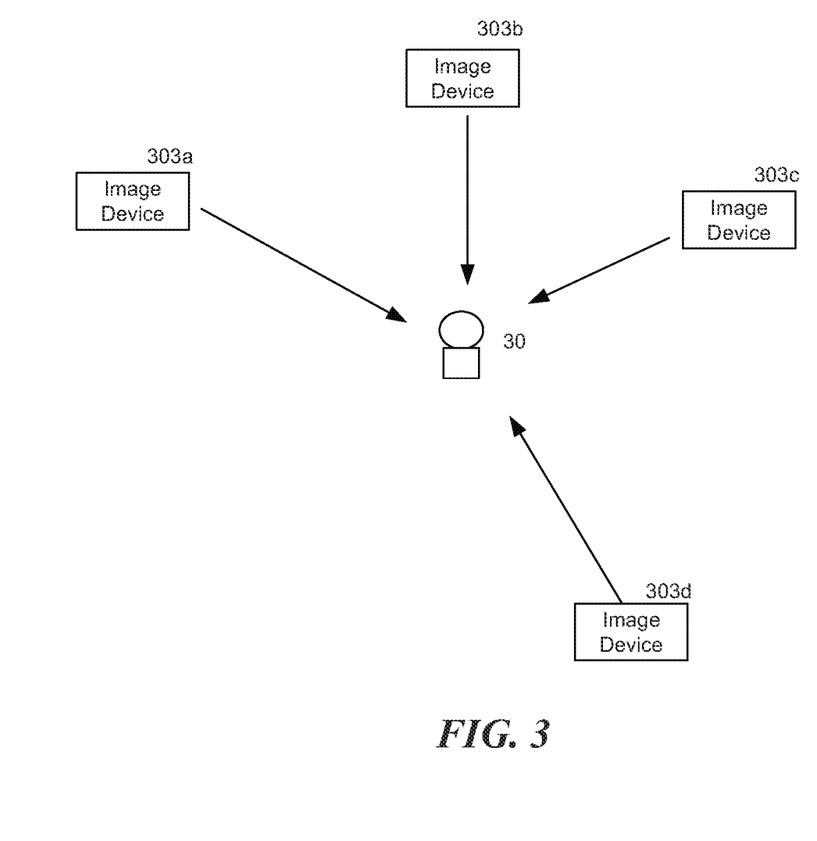
FIG. 3 is a schematic diagram illustrating a configuration of multiple image devices in accordance with embodiments of the disclosed technology.

FIG. 3 is a schematic diagram illustrating a configuration of multiple image devices 303 (only four image devices 303*a-d* are shown in FIG. 3) in accordance with embodiments of the disclosed technology. As shown in FIG. 3, the images devices 303*a-d* are positioned in different locations relative to an object 30 (e.g., surrounding the object 30). In some embodiments, the object can be a person, an animal, a group of players, an area, a playfield, a stage, and/or other suitable objects or areas to be observed or viewed.

The images devices 303*a-d* are positioned such that they can collect images associated with the object 30 from various angles of view. The collected images can then be transmitted to an image server (e.g., the image sources 203, the system 100, etc.) for broadcasting or for further process. In some embodiments, the images devices 303*a-d* can be positioned in a different manner (e.g., having different elevation, being movable, etc.) In some embodiments, the image devices 303 can include one or more of the followings: an image module of a portable device, a portable camera, a sports camera, a fixed camera, a surveillance camera, a hidden camera, and/or other suitable image collection devices.

Figure 4:
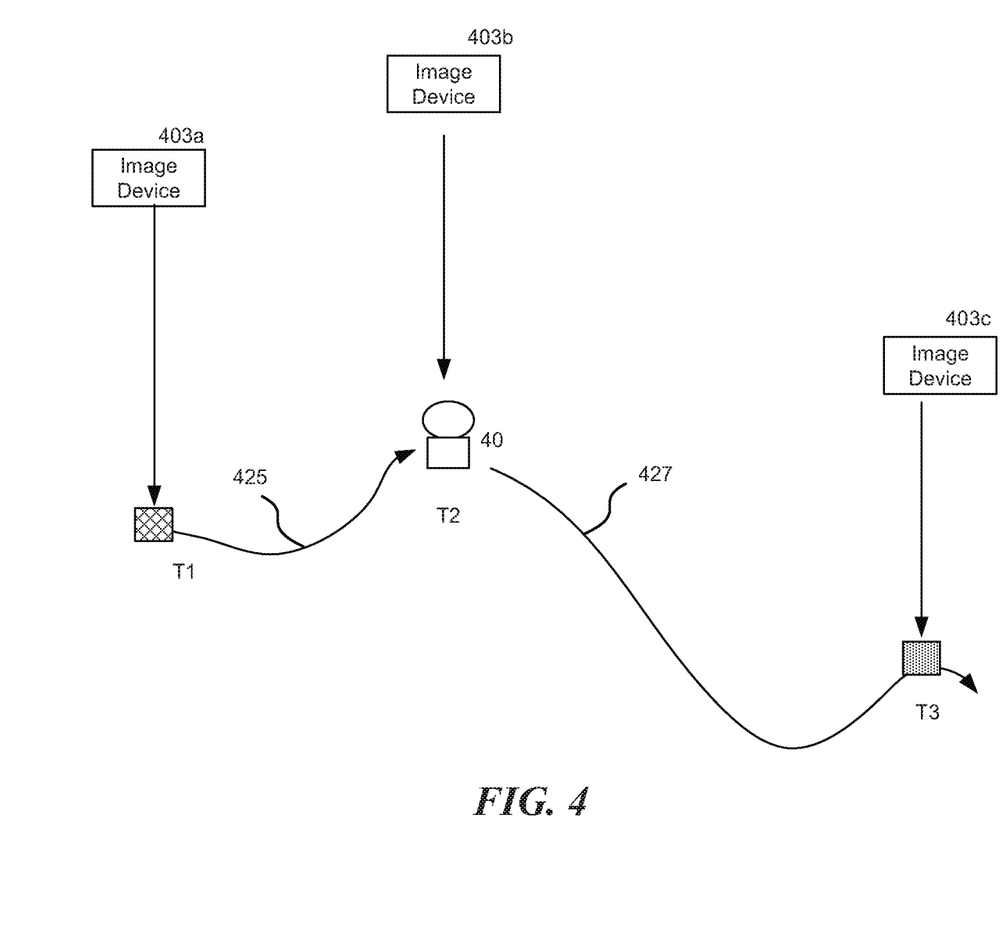
FIG. 4 is a schematic diagram illustrating a configuration of multiple image devices in accordance with embodiments of the disclosed technology.

FIG. 4 is a schematic diagram illustrating another configuration of multiple image devices 403 (e.g., only three image devices 403*a-c* are shown in FIG. 4) in accordance with embodiments of the disclosed technology. As shown in FIG. 4, a moving object 40 moves along a first trajectory 425 from point T1 to point T2, and moves along a second trajectory from point T2 to point T3. The images devices 403*a-c* are positioned such that they can collect images associated with the moving object 40 from various angles of views. For example, the image device 403*a* is positioned to collect images associated with the moving object 40 at point T1, and the image device 403*c* is positioned to collect images associated with the moving object 40 at point T3. The image device 403*b* (e.g., a drone camera) moves with the moving object 40 along the first and second trajectories 425, 427 and configured to collect images associated with the moving object 40 when it is moving (e.g., including points T1, T2 and T3). By this arrangement, the images devices 403*a-c* can collect images associated with the moving object 40 from various angles of view. The collected images can then be transmitted to an image server (e.g., the image sources 203, the system 100, etc.) for broadcasting or for further process.

Figure 5:
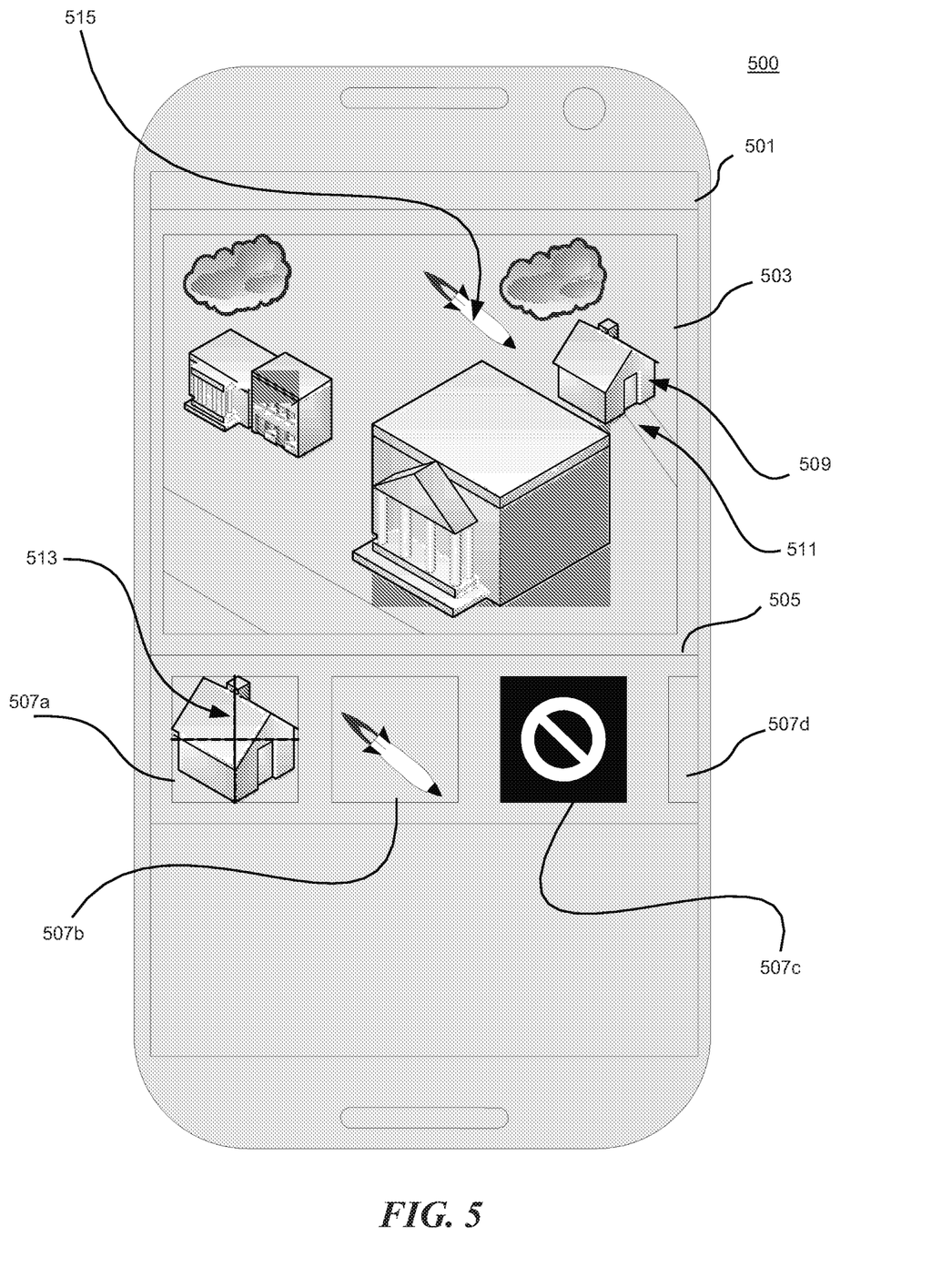
FIG. 5 is a schematic diagram illustrating a user interface in accordance with embodiments of the disclosed technology.

FIG. 5 is a schematic diagram illustrating a user interface 501 of a user device 500 in accordance with embodiments of the disclosed technology. As shown, the user interface 501 includes a first area 503 and a second area 505 configured to display images from various image sources. In the illustrated embodiments, the first area 503 is configured to display images from a primary image source, and the second area 505 is configured to display images from one or more secondary image sources. As shown, the first area 503 is greater than the second area 505. In some embodiments, the first area 503 can be smaller than the second area 505. In some embodiments, the first area 503 and the second area 505 can have different shapes. In some embodiments, the sizes and the shapes of the first area 503 and the second area 505 can be dynamically adjusted (e.g., to enlarge or to reduce while displaying the images) by a user.

As shown in FIG. 5, the second area 505 can further include multiple sub-areas 507 (e.g., shown as sub-areas 507a-d in FIG. 5). In some embodiments, the sub-areas 507 can be configured to display images from various sources. In some embodiments, the sub-areas 507 can be configured to display a portion of the image displayed in the first area 503. In some embodiments, the sub-areas 507 can be configured to display a filtered or processed image (or image portion). The present invention enables a user to select the sub-areas 507 to be displayed in the second area 505 by performing a swiping operation (e.g., swipe left or right) on the user interface 501. For example, a user can "draw" the sub-area 507d so as to move it to the center of the second area 505.

As illustrated, the sub-area 507a is configured to display a first object 509 shown in the first area 503 (e.g., a house 509). The image displayed in the sub-area 507a can be edited (e.g., the image of a "road" 511 in front of the house 509 has been removed or filtered when being displayed in the sub-area 507a) or annotated (e.g., to add a reference line 513 for measuring/referencing the house 509).

The sub-area 507b is configured to display a second object 515 (e.g., a rocket 515) shown in the first area 501 from a different image source (e.g., with a different angle of view). In the illustrated embodiments, the sub-area 507c indicates that a certain image source is not available for the moment (and it can be available at some other time). By adjusting the sub-areas 507a-d shown in the user interface 500, the present technology enables a viewer to view multiple images in a customized fashion.

In some embodiments, the present technology can display streaming images in the first area 503 from a primary image source and only show a "static" image (e.g., not streaming) in the second area 505. Doing so can reduce data transmission (e.g., and accordingly transmission expenses, in some embodiments). When a user wants to view the images from a secondary image source, the user can click the static image to initiate the streaming process.

Figure 6:
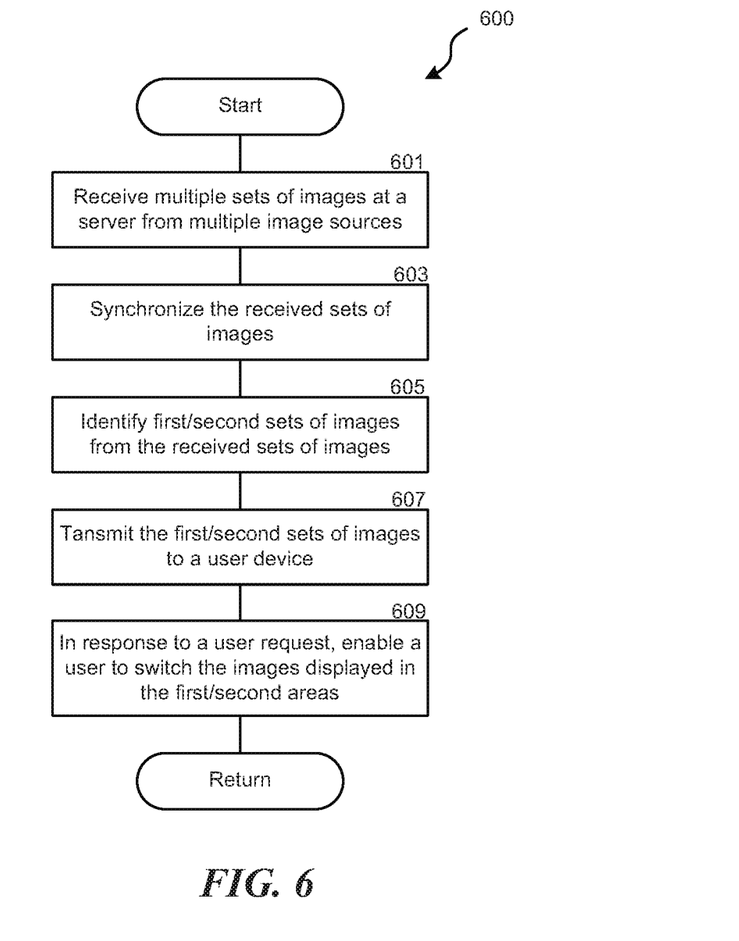
FIG. 6 is a flowchart illustrating a method in accordance with embodiments of the disclosed technology.

FIG. 6 is a flowchart illustrating a method 600 for managing multiple broadcasting images in accordance with embodiments of the disclosed technology. The method 600 can be implemented by a system (e.g., system 100), a computer, a server, or other suitable devices. At block 601, the method 600 starts by receiving multiple sets of images, at a server, from multiple image sources. Each set of the images having an image information (e.g., a time period that the set of images was generated, a location where the set of images was collected, and a viewing angle at which the set of images was created). At block 603, the received sets of images are synchronized at least based in part on the image information. The method 600 continues at block 605 by identifying first and second sets of images from the received sets of images. The first set of images is configured to be displayed in a first area (e.g., element 503 shown in FIG. 5) of a user interface (e.g., the user interface 501) of a user device. The second set of images is configured to be displayed in a second area (e.g., element 505 shown in FIG. 5) of the user interface. The first area is greater (e.g., thus more visible) than the second area.

At block 607, the identified first and second sets of images are transmitted to the user device, such that the first set of images can be displayed in the first area and the second set of images can be displayed in the second area. At block 609, the method 600 enables a user to "switch" or "swap" the images displayed in the first and second areas. More particularly, the system, in response to a user request (or a triggering event), transmits the first set of images to the user device to cause the first set of images to be displayed in the second area. Also, in response to the user request, the system transmits the second set of images to the user device to cause the second set of images to be displayed in the first area. The method 600 then returns for further process.

In some embodiments, the method 600 can include analyzing the image information for each set of received images to determine a list of candidate image sets. The list can then be transmitted to the user device for a user to select the first and second sets of images. In some embodiments, when the first set of images is not available during a time period, the system can transmit the second set of images during the time period to the user device for displaying in the first area. Once the first set of image becomes available again, the system can restore the prior display.

Similarly, the system can transmit a backup set of images for displaying in the second area when the second set of images is not available. The present technology enables a user to set up an order or priorities associated with the multiple sets of images, such that the system can select backup images based on the order or the priorities. In some embodiments, if the user does not specify, the system can determine the priorities of the multiple image sources based on various factors such as, locations of the image sources, reliability of connection thereof, related data transmission rates, associated data transmission expenses, etc.

In some embodiments, the system allows a user to specify one or more criteria for identifying the first and second sets of images. Examples of the criteria include time periods, locations of the image sources, angles of view, objects or target areas to be displayed, etc.

In some embodiments, the system can analyze the statuses of the identified images or live streams. The system then creates a predetermined configuration to decide a switching point of displaying areas based on the statuses of the identified images or live streams. The identified images or live streams can be transmitted and displayed in accordance with the predetermined configuration, including switching the displaying areas of the live streams at the switching point.

Figure 7:
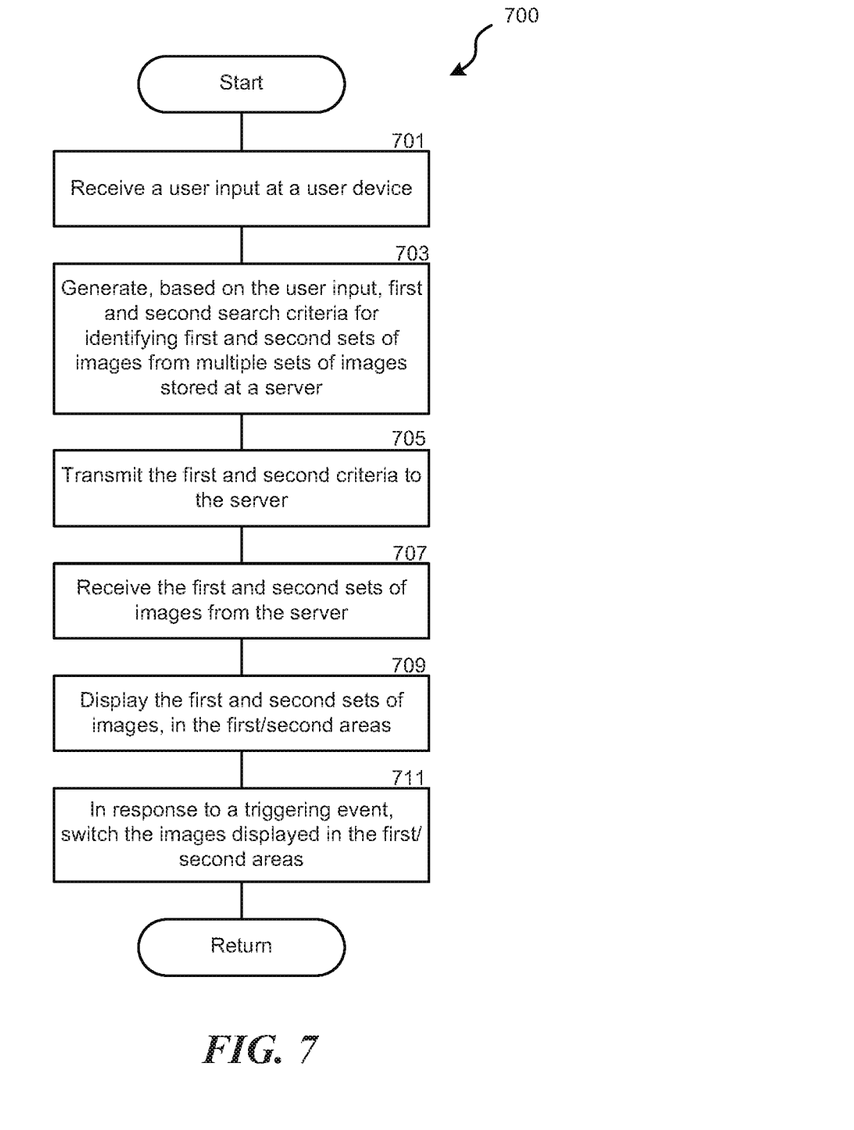
FIG. 7 is a flowchart illustrating a method in accordance with embodiments of the disclosed technology.

FIG. 7 is a flowchart illustrating a method 700 for displaying multiple broadcasting images in accordance with embodiments of the disclosed technology. The method 700 can be implemented by a system (e.g., system 200), a computer, a user device, or other suitable devices. At block 701, the method 700 starts by receiving a user input (or a user setting) at a user device. The user input is indicative of selecting the images to be displayed. At block 703, the system then generates, based on the user input, first and second search criteria for identifying first and second sets of images from multiple sets of images stored at a server. At block 705, the system transmits the first and second criteria to the server, and then at block 707, the system receives the first and second set of images. At block 709, the first set of images is displayed in a first area of a user interface of the user device, and the second set of images is displayed in a second area of the user interface.

At block 711, in response to a triggering event, the system switches or swaps the images displayed in the first and second areas. Examples of the triggering events include: availability of the images to be displayed, user preferences, user settings, user requests, and/or other suitable pre-determined events or user actions. By this arrangement, the present technology enables a user to display multiple sets of images in a customized manner.

In some embodiments, before initiating a multiple-images-display process, the system can first determine whether there are multiple images available. If so, the system can then implement the method 600 or 700 as described above. If not, the system can then initiate a single-image-display process, where the system only displays images from a single image source.

In some embodiments, the system enables a user to set up a default image source (e.g., to select a primary image source and one or more secondary image sources). In some embodiments, the system enables a user to determine when to stop or terminate the multiple-images-display process (e.g., after a certain period of time, when the primary image source is not available, etc.). In some embodiments, the system enables a user to customize various ways to display multiple sets of images by setting up a combination of two or more triggering events which may correspond to particular types of user actions, occasions, situations, environmental conditions, etc.

For example, when a primary image source is not available, a user can instruct the system to find a secondary image source that is in proximity of the primary image source as a backup. As another example, a user can instruct the system to find a second image source based transmission speed when the image quality of the primary image source is lower than an acceptable threshold (e.g., caused by smog in front of the primary image source). In some embodiments, the system can provide recommendations for displaying the images based on user histories, subscriptions, account information, and/or other suitable factors.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for managing multiple broadcasting images, comprising:
   receiving multiple sets of live streams at a server from multiple image sources, each set of the images having an image information;
   synchronizing the received sets of live streams at least based in part on the image information;
   in response to a user setting, identifying a first live stream from the received sets of images;
   in response to the user setting, identifying a second live stream from the received sets of images;
   analyzing a first status of the first live stream;
   analyzing a second status of the second live stream;
   creating a predetermined configuration to decide a switching point of displaying areas at least based in part on the first status and the second status before displaying the first live stream and the second live stream;
   transmitting the first live stream to the user device so as to cause the first live stream to be displayed in the first area at least based in part on the first status;
   transmitting the second live stream to the user device so as to cause the second live stream to be displayed in the second area at least based in part on the second status, wherein the first area is greater than the second area;
   in response to the predetermined configuration, at the switching point, transmitting the first live stream to the user device to cause the first live stream to be displayed in the second area; and
   transmitting the second live stream to the user device to cause the second live stream to be displayed in the first area.

2. The method of claim 1, further comprising:
   in response to a user input, analyzing, at the server, the image information for each set of received images to determine a list of candidate sets of live streams;
   transmitting the list to the user device;
   receiving a selection from the user device; and
   creating the user setting based on the selection.

3. The method of claim 1, wherein the first status includes continuality of the first live stream, and wherein the second status includes continuality of the second live stream, and wherein the predetermined configuration comprises:
   in an event that the first live stream is not available during a time period, transmitting the second live stream from the switching point to the user device so as to cause the second live stream to be displayed in the first area during the time period.

4. The method of claim 1, wherein the first status includes continuality of the first live stream, and wherein the second status includes continuality of the second live stream, and wherein the predetermined configuration comprises:
   in an event that the second live stream is not available during a time period, transmitting a third live stream from the switching point to the user device so as to cause the third live stream to be displayed in the second area during the time period.

5. The method of claim 1, wherein the first status includes continuality of the first live stream, and wherein the second status includes continuality of the second live stream, and wherein the predetermined configuration comprises:
   in an event that the second live stream is not available during a first time period, transmitting the second live stream to the user device so as to cause the second live stream to be displayed in the second area during a second time period.

6. The method of claim 1, further comprising:
   in response to the user input, identifying a third live stream from the received sets of images, the third live stream is configured to be displayed in a third area of the user interface of the user device, wherein the third area is located adjacent to the second area, and wherein the third area and the second area have a substantially equal dimension.

7. The method of claim 1, wherein the image information includes a time period that the live stream was generated, a location where the live stream was collected, and a viewing angle at which the live stream was created.

8. The method of claim 1, wherein a first displaying frame rate in the first area is larger than a second displaying frame rate in the second area, and wherein the second displaying frame rate is larger than zero.

9. The method of claim 1, wherein the user setting includes a user preference specifying a criterion to identify the first and second sets of live streams based on the image information.

10. The method of claim 1, further comprising:
    in response to a triggering event, restoring transmitting the first live stream to the user device to cause the first live stream to be displayed in the first area; and in response to the triggering event, restoring transmitting the second live stream to the user device to cause the second live stream to be displayed in the second area.

11. The method of claim 1, further comprising:
determining a default order for the received sets of live streams at the server based on a number of downloads for each of the received sets of images; and
identifying the first and second sets of images based on the default order.

12. The method of claim 1, further comprising:
determining a default order for the received sets of live streams at the server based on continuity of each of the received sets of images; and
identifying the first and second sets of images based on the default order.

13. The method of claim 1, further comprising:
determining a default order for the received sets of live streams at the server based on content of each of the received sets of images; and
identifying the first and second sets of images based on the default order.

14. The method of claim 6, further comprising:
assigning a priority to each of the second and third live stream; and
based on the priority, determining whether to transmit the second live stream or the third live stream to the user device to be displayed in the first area, in an event that the first live stream is unavailable.

15. The method of claim 14, wherein the priority is assigned according to display frequencies of the second and third live streams.

16. A method for displaying multiple broadcasting images, comprising:
receiving a user input at a user device;
generating, based on the user input, a first search criterion for identifying a first live stream from multiple sets of live streams stored at a server, the first live stream being configured to be displayed in a first area of a user interface of the user device at least based in part on a first status of the first live stream;
generating, based on the user input, a second search criterion for identifying a second live stream from the multiple sets of images stored at the server, the second live stream being configured to be displayed in a second area of the user interface of the user device, wherein the first area is greater than the second area at least based in part on a second status of the second live stream;
transmitting the first and second criteria to the server;
receiving the first and second sets of images from the server;
displaying the first live stream in the first area;
displaying the second live stream in the second area; and
in response to a triggering event, displaying the second live stream in the first area.

17. The method of claim 16, further comprising:
in response to the triggering event, displaying the first live stream in the second area.

18. The method of claim 16, wherein the triggering event includes that the first live stream is not available during a first time period, and wherein the method further comprises:
in response to the triggering event, discontinuing displaying the second live stream in the second area.

19. A system for managing live stream images, the system comprising:
a processor;
a memory coupled to the processor;
a communication device coupled to the processor and configured to receive multiple sets of live stream images, each set of the live stream images having an image information; and
a database coupled to the processor and configured to store the multiple sets of live stream images;
wherein the memory is configured to store instructions, when executed, to:
synchronize the stored live stream images at least based in part on the image information;
in response to a user setting, identify a first live stream from the stored live stream images;
in response to the user setting, identify a second live stream from the stored live stream images;
analyzing a first status of the first live stream;
analyzing a second status of the second live stream;
creating a predetermined configuration to decide a switching point of displaying areas at least based in part on the first status and the second status before displaying the first live stream and the second live stream;
transmit the first live stream to the user device so as to cause the first live stream to be displayed in the first area;
transmit the second live stream to the user device so as to cause the second live stream to be displayed in the second area, wherein the first area is greater than the second area;
in response to the predetermined configuration, at the switching point, transmit the first live stream to the user device to cause the first live stream to be displayed in the second area; and
transmit the second live stream to the user device to cause the second live stream to be displayed in the first area.

20. The system of claim 19, wherein the memory is configured to store instructions, when executed, to:
analyze the image information for each set of stored live stream images to determine a list of candidate image sets;
transmit the list to the user device;
receiving a selection from the user device;
identify the first and second sets of live streams based on the selection.

* * * * *